United States Patent

Bower

[15] 3,648,275

[45] Mar. 7, 1972

[54] BUFFERED ANALOG CONVERTER

[72] Inventor: Kenneth F. Bower, Merritt Island, Fla.

[73] Assignee: The United States of America as represented by the Administrator of the National Aeronautics and Space Administration

[22] Filed: Apr. 3, 1970

[21] Appl. No.: 25,488

[52] U.S. Cl. .......................................340/347 DA, 235/154
[51] Int. Cl. ..........................................................H03r 13/02
[58] Field of Search .....................340/347 DA; 235/154, 155

[56] References Cited

UNITED STATES PATENTS

| | | | |
|---|---|---|---|
| 3,155,962 | 11/1964 | Beter et al. | 340/347 DA X |
| 3,064,248 | 11/1962 | Glick | 340/347 DA |
| 3,178,564 | 4/1965 | Klahn et al | 235/154 |
| 2,907,021 | 9/1929 | Woods | 340/347 DA |

OTHER PUBLICATIONS

A. K. Susskind, Notes On Analog–Digital Conversion Techniques, 1957, pp. 5– 19

*Primary Examiner*—Thomas A. Robinson
*Attorney*—James O. Harrell and G. T. McCoy

[57] ABSTRACT

A converter for converting a binary digital code into an analog representation. The converter includes a timing system which is operated by a clock signal to produce a synchronized timing pulse. The digital information is fed into a holding register, and such is gated through a plurality of gates that feeds the complement of the digital code into a counter. The relative duration of the output signal of the last state of the counter in a logic "one" state corresponds to the weight of the digital code being fed into the holding register.

2 Claims, 2 Drawing Figures

Patented March 7, 1972 3,648,275

INVENTOR.
KENNETH F. BOWER

BY

James O. Harrell

ATTORNEYS

BUFFERED ANALOG CONVERTER

The invention described herein was made by an employee of the United States Government, and may be manufactured and used by or for the Government for governmental purposes without the payment of any royalties thereon or therefor.

This invention relates to a digital-to-analog converter and more particularly to a digital-to-analog converter wherein a digital word can be fed into the converter in parallel to produce a DC voltage directly proportional to the value of the digital word. The DC voltage varies accordingly as the digital word varies.

One method of digital-to-analog conversion presently used in the industry consists of superpositioning weighted precision currents, which are caused to pass through a single resistor. The voltage drop across the resistor is the desired analog output.

Whereas, this concept is fairly simple, some problems are inherent. For example, it is not practical to make components sufficiently accurate to meet the specifications of precision for the various current sources. Therefore, trimming pots must be incorporated in all but the several least significant precision current sources. Each current must be individually adjusted which is a time consuming and bothersome problem. Some recently developed digital-to-analog converters are manufactured with machine adjusted fixed precision resistor networks. However, if any of these resistors in the network change value for any reason, such as aging, accuracy suffers. Also, gating the precision currents without inducing errors is tedious. Since all of the precision currents enter one node at a summing resistor, provisions must be made to prevent crosstalk at that point.

In accordance with the present invention, it has been found that difficulties encountered with digital-to-analog converters may be overcome by providing a novel converter. This converter, when used to convert a P-bit binary code, includes the following basic parts: (1) A timing unit which produces at its output a train of pulses, (2) a holding register which acts as a memory device and has a plurality of parallel inputs to which the binary code is applied and also has parallel outputs, (3) a plurality of gates corresponding in number to the bits of information in the code and an activating gate, (4) said plurality of gates having parallel outputs and parallel inputs coupled to the parallel outputs of the holding register, (5) a counter having a plurality of stages corresponding in number to the bits of information plus 1; the stages of the counter being connected in series and having parallel inputs coupled to corresponding outputs of the gates, (6) means for activating said gates for shifting said information in complementary form from the holding register into corresponding stages of the counter and causing the last stage of the counter to be set to one state, (7) means for applying a signal to the first stage of the counter for causing the counter to count down according to information stored in the counter so that the duration the last stage of the counter remains in said one state corresponds to the value of the binary code, (8) means coupled to the last stage of the counter for interrupting said signal being supplied to the first stage of the counter responsive to the last stage changing to another state, and (9) filter means coupled to the output of the last stage of the counter for producing a DC signal having an amplitude corresponding to the value of the binary code.

Accordingly, it is an important object of the present invention to provide a new and novel digital to analog converter which does not require precision resistors, but relies on inherent time accuracy and repeatability of the digital circuitry.

Another important object of the present invention is to provide a simple and accurate digital-to-analog converter.

Still another important object of the present invention is to provide an inexpensive digital-to-analog converter without sacrificing accuracy.

A further important object of the present invention is to provide a digital-to-analog converter which is readily acceptable to miniaturization in integrated circuit form.

Other objects and advantages of this invention will become more apparent from a reading of the following detailed description and appended claims, taken in conjunction with the accompanying drawing wherein:

Figure 1:
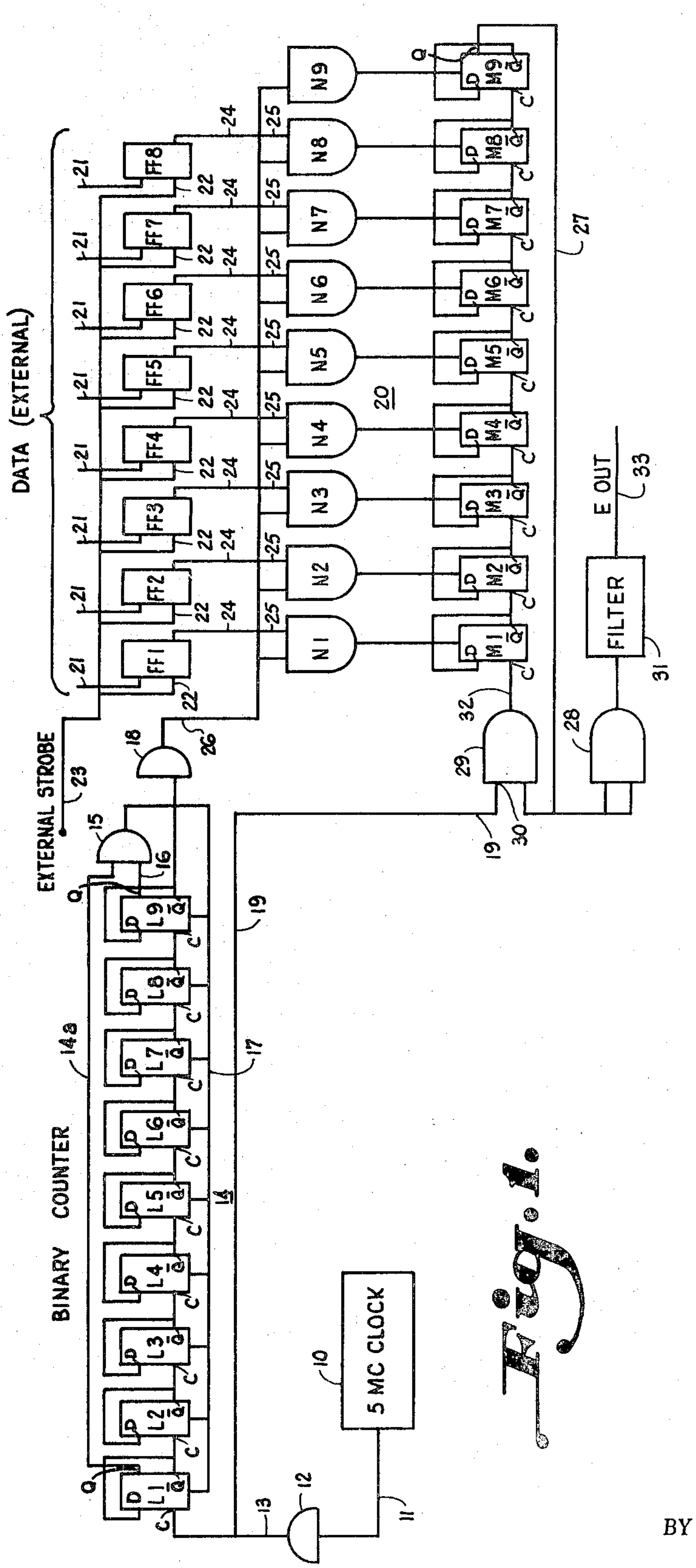
FIG. 1 is a schematic diagram showing the digital-to-analog converter.

Referring in more detail to the drawing, a schematic diagram of the digital-to-analog converter is illustrated in FIG. 1. A basic timing system which produces an output strobe every 257th clock pulse, and a clock pulse of 5 megacycles is illustrated on the left. The manner in which the 257 strobe pulse is produced is as follows: A 5-megacycle clock 10 which may be any conventional free-running oscillator, produces a 5-megacycle signal on line 11. This signal is fed through an inverter 12 for isolation purposes. The output of the inverter 12 is fed by lead 13 into a nine-bit ripple-carry binary counter, generally designated by the reference character 14, which is logically wired to produce a reset pulse on each 257th clock pulse to reset all of the flip-flops L–1 through L–9. It is noted that each of the flip-flops has an input C which is referred to as clock input, as well as an input D which is referred to as data input, plus two outputs labeled Q and $\overline{Q}$ which are complementary functions. It is noted that the Q output of flip-flops L–2 through L–8 is not utilized and therefore not shown in the drawing. The $\overline{Q}$ output lead of each of the flip-flops is connected to the C input of the succeeding flip-flop and, also back to its own D input. Essentially, at the $\overline{Q}$ output of a particular flip-flop L–1 through L–9 there will be a wave of exactly one-half the frequency of the signal coming in on the respective C clock input. Therefore, since a 5-megacycle clock pulse is applied to the input C of flip-flop L–1, there will appear a 2½ megacycle on the output $\overline{Q}$ terminal thereof. Each succeeding flip-flop L–2 through L–9, respectively, subsequentially divides the frequency of the signal in half.

It is noted that the output terminal Q from flip-flop L–1 is fed by lead **14*a* to an input terminal of a NAND-gate 15. The output terminal Q of flip-flop L–9 is coupled via lead 16 to the same NAND-gate 15. The purpose of this is to generate a reset pulse at the output of the NAND-gate 15 on each 257th clock pulse. This reset pulse coming out of NAND-gate 15 is fed back over lead 17 to the reset junction (bottom junction) of each of the flip-flops resetting all of such to the "0" state. During that 257th pulse the $\overline{Q}$ output of flip-flop L–9 is sending a low signal to the inverter 18. The inverter 18 inverts this low signal and produces a strobe pulse at the rate of one strobe pulse for each 257 pulses applied by the 5 megacycles to the input terminal C of flip-flop L–1. It is also noted that the 5-megacycle clock pulse is fed from the output of inverter 12 over lead 19 to be used in the converter circuit shown on the right of the schematic diagram. The timing pulses represented on leads 26 and 19** can be shared by any number of converters. In a system requiring 100 distinct analog outputs for instance, only one basic timing system would be needed to provide timing for all of the 100 converters.

The converter circuit, generally designated by the reference character 20, includes a holding register which includes flip-flops FF1 through FF8, data gates, which includes NAND-gates N–1 through N–9, and a counter which includes flip-flops M–1 through M–9. These nine flip-flops are wired to form a binary ripple-carry counter.

Each of the flip-flops FF1 through FF8 has an input lead 21 upon which the binary information to be converted is fed in parallel form. A strobe input terminal 22 is provided for each flip-flop so that when a strobe pulse is supplied to lead 23 the information coming in on input lines 21 is gated into the flip-flops FF1 through FF8. The output terminal 24 of each of the flip-flops FF1 through FF8 is coupled to a respective input terminal 25 of one of the NAND-gates N–1 through N–8. Each of the NAND-gates N–1 through N–8 also has an input which is connected to lead 26 which receives the 257th pulse coming out of inverter 18. When there is a pulse on lead 26 such activates the NAND-gates N–1 through N–9 to shift the information from the flip-flops FF1 through FF8 in complementary form into the counter consisting of flip-flops M–1 through M–9. Note that N–9 has only signal 26 as an input. It therefore, causes M–9 to be unconditionally set to a logic "1" state whenever there is a pulse on lead 26. It is noted that the nine flip-flops M–1 through M–9 are wired to form a binary ripple-carry counter with the $\overline{Q}$ output terminal being connected to the succeeding C input terminal and also back to its own D terminal. This counter operates the same way as the counter 14.

The Q output of flip-flop M–9 is connected via lead 27 to the input of an inverter 28, as well as to an input of a NAND-gate 29. Connected to another input 30 of the NAND-gate 29 is the 5-megacycle clock pulse coming in on lead 19. The output of the inverter 28 is coupled to a low-pass filter network 31.

In summarizing the operation, the digital information which is to be converted to an analog representation is applied in parallel form to the inputs 21 of the respective flip-flops FF1 through FF8 in the holding register. An external strobe pulse from any suitable source is applied over lead 23 to the clock input terminal 22 of each of the flip-flops FF1 through FF8 to gate the data coming in parallel form into the flip-flops FF1 through FF8. The flip-flops FF1 through FF8 hold this data information until the next strobe pulse comes in on line 23. This strobe pulse can be, as previously mentioned, from any suitable conventional source, such as a computer or a telemetry decommutator, etc. Moreover, the strobe pulse may be applied asynchronously. The data stored in flip-flops FF1 through FF8 is made available to NAND-gates N–1 through N–8, and is gated through to the counter on the 257 strobe pulse appearing on line 26. The circuitry is such as a result of NAND-gates N–1 through N–8 that the information which is shifted out of flip-flops FF1 through FF8 is shifted into the flip-flops M–1 through M–8 as the complement of the binary code. At the same time that information is shifted from the holding register to the counter the strobe pulse on line 26 sends a signal through NAND-gate N–9 to flip-flop M–9 unconditionally setting it to a logic "1." The Q output of flip-flop M–9 then enables NAND-gate 29 allowing the 5-megacycle clock pulse coming in on line 19 to appear at junction 32 in a manner similar to the ripple-carry binary counter described previously in FIG. 1. The counter then counts down until flip-flop M–9 is set back to logic "0." At this time line 27 becomes logic "0" disabling NAND-gate 29 and enabling inverter 28. As a result, on the output of the inverter 28 there is a periodic wave train which has a duty cycle (the percent of the time that is spent at logic "1") of a duration directly proportionate to the data that was stored in the holding register. This wave train, in turn, is fed through the low pass filter 31 which produces a DC voltage on the output line 33 thereof, having an amplitude directly proportional to the data value which was fed into the flip-flops FF1 through FF8. If the binary information, which is being converted to an analog representation has a weight, for example, of 64 which is represented by $N$, then the pulse 35 would remain at E volts level for a count of 65 ($N\pm1$).

At some convenient point in time, the counter is assumed to have a value of 000000000. Note that the lease significant bit is at the left. Assume that the data in the holding register has a value of three: 11000000. The logic level at the point labeled 32 is logic "1," since the output from flip-flop M–9 which is fed to gate 29 is logic "0." Now, a "257 pulse" appears on lead 26. A low input to the reset terminal C sets the flip-flops used in the counter to logic one; those flip-flops with high inputs at the reset terminal remain reset. The counter, therefore, is set to a value of 001111111, which is the complement of the binary code, with the most significant bit of the counter M–9 unconditionally being set to logic "1."

Since M–9 is set to a logic 1, the 5-megacycle clock signal is gated through gate 29 to the input terminal C of flip-flop M–1 and the counter begins to count. The count sequence is:

001111111
101111111

011111111
111111111
000000000

Thus, M–9 returns to 0, point 32 is latched to logic "1," and the counter has returned to the condition that was initially assumed for it. The M–9 output was at logic "1" for four clock pulses for a data input value of three. Therefore, if the data value were $N$, the M–9 output would be at a logic "1" level for $N+1$ clock cycles out of each group of 257 clock cycles.

Figure 2:
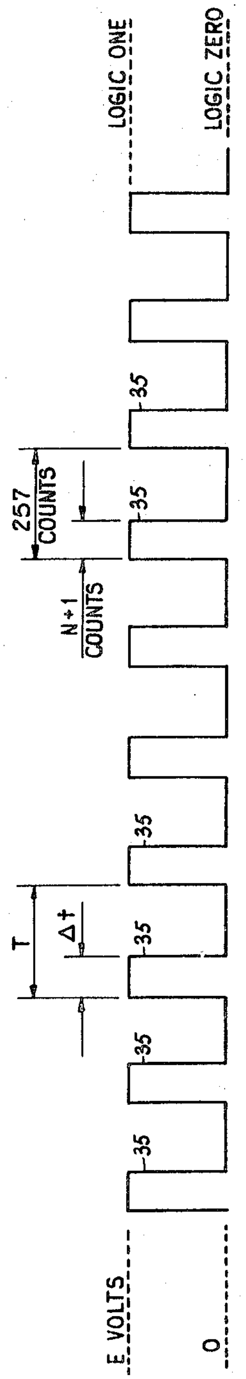
FIG. 2 is a diagram of the wave train illustrating an example of the signal that would appear on the output of the counter.

If the system runs undisturbed, then, the M–9 output is a series of pulses, with a duty cycle which bears a direct and precise relationship to the data value. The output is represented pictorially in FIG. 2 for a weighted binary value of approximately 64.

If the converter is to be used to convert a binary code having $P$ bits, then there should be $P+1$ gates and, also, $P+1$ stages in the counter. Moreover, the basic timing system would provide the 5-megacycle clock and one pulse on line 26 for every $2^{P+1}$ clock pulses.

While a preferred embodiment of the invention has been described using specific terms, such description is for illustrative purposes only, and it is to be understood that changes and variations may be made without departing from the spirit or scope of the following claims.

I claim:

1. A converter for converting a P-bit binary code in which each bit of said code is either a logic "0" or a logic "1" to an analog representation comprising:

A. a holding register having inputs and parallel outputs,
B. means for gating said binary code into said holding register,
C. a plurality of gates corresponding in number to said bits of information in said code,
D. an activating gate having an output,
E. said plurality of gates having parallel outputs and parallel inputs coupled to the parallel outputs of said holding register,
F. a binary counter having a plurality of stages corresponding in number to said bits of information plus a last stage, all being connected in series,
G. said plurality of stages of said binary counter having parallel inputs coupled to corresponding outputs of said plurality of gates,
H. said last stage of said binary counter having an input coupled to said output of said activating gate,
I. means for activating said plurality of gates and said activating gate for shifting said binary code in complementary form from said holding register into corresponding stages of said binary counter and causing said last stage of said binary counter to be set to the "1" state,
J. a NAND gate having a pair of inputs and an output,
K. means for coupling the output of said NAND gate to a first stage of said binary counter,
L. means for applying a repeating clock signal to one of said inputs of said NAND gate for causing said counter to count in sequence according to the binary code stored in said binary counter so that the duration that said last stage of said binary counter remains in said "1" state corresponds to the value of said binary code,
M. means for coupling the output of said last stage of said binary counter to an input of said NAND gate for interrupting said clock signal being supplied to said first stage of said binary counter responsive to said last stage of said binary counter changing back to its original state, and
N. filter means coupled to the output of said last stage of said binary counter for producing a DC signal having an amplitude corresponding to the value of said binary code.

2. The converter as set forth in claim 1 wherein:

A. said means for activating said activating gate is synchronized with said clock signal so that said plurality of gates and said activating gate are activated only once during a period of time necessary for the binary counter to count from the first stage to said last stage.

* * * * *